United States Patent
Obie

(10) Patent No.: US 7,026,470 B2
(45) Date of Patent: Apr. 11, 2006

(54) USE OF CARBOXYMETHYL CELLULOSE ACETATE BUTYRATE AS A PRECOAT OR SIZE FOR CELLULOSIC MAN-MADE FIBER BOARDS

(75) Inventor: Ronald Obie, High Point, NC (US)

(73) Assignee: Eastman Chemical Corporation, Kingsport, TN (US)

(*) Notice: Subject to any disclaimer, the term of this patent is extended or adjusted under 35 U.S.C. 154(b) by 403 days.

(21) Appl. No.: 09/985,176

(22) Filed: Nov. 1, 2001

(65) Prior Publication Data

US 2002/0090462 A1 Jul. 11, 2002

Related U.S. Application Data

(60) Provisional application No. 60/244,656, filed on Nov. 1, 2000.

(51) Int. Cl.
- *C08B 3/08* (2006.01)
- *C08L 1/14* (2006.01)
- *C09D 101/14* (2006.01)

(52) U.S. Cl. .................. 536/68; 536/76; 106/135.1; 106/136.1

(58) Field of Classification Search .................. 536/68, 536/76; 106/135.1, 136.1, 135
See application file for complete search history.

(56) References Cited

U.S. PATENT DOCUMENTS

| | | | | |
|---|---|---|---|---|
| 3,435,027 A | 3/1969 | Desmarais et al. | ......... | 260/226 |
| 3,789,117 A | 1/1974 | Tsujino | ......... | 424/35 |
| 4,520,192 A | 5/1985 | Namikoshi | ......... | 536/66 |
| 4,590,265 A | 5/1986 | Bogan et al. | ......... | 536/63 |
| 5,008,385 A | 4/1991 | Diamantoglou | ......... | 536/56 |
| 5,668,273 A | 9/1997 | Allen et al. | ......... | 536/66 |
| 5,792,856 A | 8/1998 | Allen et al. | ......... | 536/66 |
| 5,973,139 A | 10/1999 | Lee et al. | ......... | 536/66 |
| 5,994,530 A | 11/1999 | Posey-Dowty et al. | ....... | 536/66 |

FOREIGN PATENT DOCUMENTS

| | | |
|---|---|---|
| GB | 2 284 421 A | 6/1995 |
| RO | 96929 A | 5/1989 |
| SU | 612933 A | 6/1978 |

OTHER PUBLICATIONS

Malm et al., "Preparation of Cellulose Acetate Action of Sulfuric Acid", *Maim. Ind. Eng. Chem.*, vol. 38, pp. 77, (1946).

Taraboulsi et al., "Reverse Osmosis Studies on Desalination Membranes Formed From Chemically Modified Cellulose Acetate", *Carbohydrate Research*, vol. 13, pp. 83–88, (1970).

Nagaty et al., "Carboxymethylation of Cellulose Acetate", *Holzforschung*, vol. 27, No. 2, pp. 68–70, (1973).

*Primary Examiner*—James O. Wilson
*Assistant Examiner*—Everett White
(74) *Attorney, Agent, or Firm*—Bernard J. Graves, Esq.; Michael K. Carrier, Esq

(57) ABSTRACT

A method for improving holdout on a coated, cellulosic substrate, such as a man-made fiber board. The process comprises the steps of applying an aqueous carboxymethyl cellulose acetate butyrate size composition to a man-made fiber substrate, forming a sized substrate. The sized substrate is then dried. Next, an aqueous coating composition is applied to form a coated, sized substrate. The coated, sized substrate is then dried. According to the invention, the aqueous carboxymethyl cellulose acetate butyrate size composition used in the process comprises carboxymethyl cellulose acetate butyrate, water, and an organic solvent. The invention also relates to a sized, man-made fiber substrate comprising a man-made fiber substrate and a carboxymethyl cellulose acetate butyrate size. The carboxymethyl cellulose acetate butyrate may be either an internal sizing agent, or an external sizing agent.

8 Claims, No Drawings

USE OF CARBOXYMETHYL CELLULOSE ACETATE BUTYRATE AS A PRECOAT OR SIZE FOR CELLULOSIC MAN-MADE FIBER BOARDS

This application claims priority of copending provisional application(s) No. 60/244,656 filed on Nov. 1, 2000.

BACKGROUND

Cellulose esters are polymers, which are useful in many plastic, film, coating and fiber applications. In coatings applications, cellulose esters are generally applied from organic solvent solutions. However, in an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in organic solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of such aqueous coating compositions.

U.S. Pat. Nos. 5,668,273 and 5,994,530 disclose the use of carboxylalkyl cellulose esters, as well as their use in aqueous pigment dispersions and coating compositions. U.S. Pat. No. 5,668,273 discloses various new ether derivatives of cellulose esters, which are described as being useful in coating compositions as binder resins and rheology modifiers. These esters are described as having good solubility in a wide range of organic solvents, compatibility with a variety of resins, and ease of dispersion in a water-borne formulation. U.S. Pat. No. 5,994,530 describe carboxymethyl cellulose esters of higher acids that are used in aqueous dispersions, which are useful in formulating waterborne coating compositions containing pigments.

Methods of preparing carboxylalkyl cellulose esters are known in the art. For example, U.S. Pat. Nos. 5,973,139; 5,792,856; and 4,590,265 describes carboxylated cellulose esters, and various synthetic processes for their preparation. U.S. Pat. No. 5,973,139 describes a process which includes activating an oxidized cellulose with water, followed by dehydration using acetic acid, and optionally displacing at least some of the acetic acid with butyric acid or propionic acid. The activated cellulose ester is then reacted with an esterifying reagent in the presence of a catalyst. The temperature is gradually increased to a level sufficient to complete the esterification. The carboxylated ester is then hydrolyzed to obtain the desired degree of substitution, and precipitated from solution.

U.S. Pat. No. 5,792,856 describes a process for preparing carboxyalkyl cellulose esters. The process involves slurrying water wet carboxy($C_1$–$C_3$ alkyl) cellulose (acid form) in a solvent, followed by treating the mixture with certain anhydrides in the presence of a strong acid catalyst. The mixture is heated to about 40° to 55° C. until the reaction is complete. Next, a mixture of water, an alkanoic acid, and optionally a $C_2$–$C_5$ alkanoic acid salt of an alkali or alkaline earth metal is added, in an amount that does not totally neutralize the strong acid catalyst. The solution is then heated to effect partial hydrolysis, and in an amount depending on the amount of strong acid catalyst, treated with a $C_2$–$C_5$ alkanoic acid salt of an alkali or alkaline earth metal dissolved in water and an alkanoic acid.

U.S. Pat. No. 4,590,265 relates to a method for the preparation of carboxylated cellulose esters, by reacting a cellulose ester with ozone at a temperature of about 25° to 80° C., for a period of time sufficient to yield the carboxylate cellulose ester product. The patent also discloses applications for the carboxylated cellulose esters, including metal coatings, pigment dispersions, wood coatings, and inks.

U.S. Pat. No. 4,520,192 describes a process for preparing carboxyalkyl acetyl celluloses with a carboxyalkyl degree of substitution (DS) per anhydroglucose unit of 0.2–2.5 and an acetyl DS of 0.5–2.8 and the metal salts of these materials. The preparation of the carboxyalkyl acetyl cellulose is accomplished by converting carboxyalkyl cellulose, sodium salt, into its acid form by soaking in an aqueous acid solution of sulfuric acid, hydrochloric acid, nitric acid, or acetic acid. This is followed by washing with water, solvent exchange of the water with acetic acid, and reaction with acetic anhydride in the presence of a catalyst (sulfuric acid, perchloric acid, sulfoacetic acid or zinc chloride) to give a trisubstituted carboxy acetyl cellulose, i e., carboxymethyl cellulose acetate, upon precipitation into water. Also described is a process for converting the carboxyalkyl acetyl cellulose product (acid form) to its corresponding sodium, potassium, calcium, or ammonium carboxylate salt. The acid forms of the trisubstituted carboxyalkyl acetyl celluloses were insoluble in water and aqueous lower chain alcohol solutions. These materials were soluble in acetone and methylene chloride/ethanol 9/1. The sodium salt of the carboxyalkyl acetyl cellulose was soluble in water, an aqueous lower alkyl alcohol containing a large amount of water, or aqueous acetone; however, it was insoluble in methylene chloride/ethanol 9/1. This process is believed to yield a product containing an unneutralized strong acid with high sulfur levels. Consequently, this ester would be unstable under general drying conditions or other heat treatment.

U.S. Pat. No. 3,435,027 describes a base catalyzed (sodium hydroxide) esterification of carboxymethyl cellulose (in the sodium salt form) in 70–85% acetone nonsolvent media with acetic, propionic, lactic, or stearyl anhydride. The procedure yields a product with a low degree of ester substitution and falls well short of a fully substituted cellulose.

USSR Patent 612933 describes a process for preparation of cellulose acetate ethers wherein an alkali activated cellulose (12% sodium hydroxide) is etherified with monochloroacetic acid followed by esterification with acetic anhydride in the presence of sulfuric acid catalyst. The process is limited to a low DS of the carboxymethyl substituent.

U.S. Pat. No. 3,789,117 discloses a process for preparing an enteric medicament coating from an organic solvent soluble cellulose derivative. The cellulose derivative's substitution has a carboxymethyl DS range of 0.3 to 1.2 in conjunction with at least one of the remaining hydroxyl groups being etherified or esterified. Ester groups include acetyl, propionyl, butyryl, nitric, or higher fatty acids. The degree of substitution is not specified.

RO 96929 (Romania) describes a carboxymethyl cellulose (CMC) acetate with a carboxymethyl degree of substitution of 0.5–3.0, acetyl DS of 0.4–2.9, and viscosity 150–1500 cP. This material was taught to be useful as an alkaline suspension stabilizer, solution thickener, and alkaline media binder. The material was prepared by mixing 70% acetic acid with CMC (Na salt), washing the acetic wet CMC with 50% acetic acid to remove the sodium acetate, and esterification of the acetic acid wet CMC-H with acetic anhydride for 1.5 hours at 50–110° C. in the presence of sulfuric acid.

U.S. Pat. No. 5,008,385 reports cellulose derivatives that can be synthesized by homogeneous reaction in dimethylacetamide and/or N-methylpyrrolidine containing LiCl. Included in their examples was CMC acetate (carboxymethyl DS 0.13–0.23, acetyl DS 2.54–2.15). These materials were tested for use in the production of fibers, filaments, or membranes.

Carbohydrate Research, 13, pp. 83–88, (1970) describes the preparation of CMC acetate by sulfuric acid catalyzed acetylation of CMC (carboxymethyl DS of 0.07) hydrolysis (acetylation and hydrolysis procedures taken from Maim, Ind. Eng. Chem., 38 (1946) 77), and evaluation of this material in membranes for reverse osmosis.

Holzforschung, 27(2), pp. 68–70, (1973) describes the rate of carboxymethylation and deacetylation of cellulose acetate in the presence of sodium hydroxide. This work showed that deacetylation and carboxymethylation occur simultaneously with the rate of deacetylation being faster than the rate of carboxymethylation. The highest carboxymethyl DS obtained was less than 0.1.

GB 2,284,421 discloses carboxymethyl cellulose alkanoates which are "lightly carboxymethylated", i.e., having a degree of substitution per anhydroglucose unit of less than 0.2. Such polymers are taught to be useful as a coating agent for paper and papermaking or as a bonding agent for non-woven fabric, or can be extruded to form filaments or film, or can be used to produce shaped articles.

Despite these developments in preparing carboxylalkyl cellulose esters and using them in coating applications, there remains a need in the art for a precoat or size that decreases fiber raising, and increases holdout, particularly when applied as an aqueous precoat or size composition to a substrate. Such a process should preferably reduce the number of coatings required to achieve a desired result, and produce a substrate that is compatible with an overcoat. This invention meets this need.

SUMMARY

The invention provides a method for improving holdout on a coated, cellulosic substrate, such as a man-made fiber board. The process comprises the steps of applying an aqueous carboxymethyl cellulose acetate butyrate size composition to a cellulosic substrate, forming a sized substrate. The sized substrate is then dried. Next, an aqueous coating composition is applied to form a coated, sized substrate. The coated, sized substrate is then dried. According to the invention, the aqueous carboxymethyl cellulose acetate butyrate size composition contains carboxymethyl cellulose acetate butyrate, water, and an organic solvent.

The invention also relates to a sized, man-made fiber substrate, that is a man-made fiber substrate coated with a carboxymethyl cellulose acetate butyrate size coat and an overcoat. The carboxymethyl cellulose acetate butyrate may be either an internal sizing agent, or an external sizing agent.

A substrate, which has been treated according to the invention, will exhibit increased holdout, decreased fiber raising, and increased moisture resistance. The substrate will require a fewer number of coatings to achieve a desired finish. The invention will lead to reduced processing time and reduced labor and material costs. Moreover, the invention provides a way to size a three-dimensional substrate. The substrate produced by the process of the invention will typically display increased stiffness, strength, smoothness and/or weight. The invention also produces a sized or pretreated board that is compatible with a variety of overcoats. In a preferred embodiment, the invention relates to man-made fiber boards, such as low density, medium density and high density fiber boards, for example.

Various embodiments of the invention are described below. Any of the embodiments of the invention may be used either alone or taken in various combinations. Additional objects and advantages of the invention are discussed in the detailed description that follows, and will be obvious from that description, or may be learned by practice of the invention. It is to be understood that both this summary and the following detailed description are exemplary and explanatory only and are not intended to restrict the invention.

DETAILED DESCRIPTION

This invention relates to a method for improving the holdout of a coated, cellulosic substrate. Holdout is the ability of a coating to remain at or near the surface of a substrate, as opposed to penetrating that substrate. Better holdout results in the appearance of a smoother, more uniform coated surface with increased gloss and depth as compared to a coated substrate with less holdout. This is true even though the same dry film thickness of coating may have been applied to both substrates. For instance, in a porous substrate, when a coating is applied, the coating may absorb or permeate into the substrate. A method according to the invention reduces the amount of the coating absorbed into the substrate, allowing more of the coating remain at or near the surface of the substrate. By increasing holdout in this manner, the resulting substrate has a smoother overall surface, and the substrate requires a fewer number of coatings. By reducing the number of required coatings, the invention also provides the advantages of reducing labor and material costs, while maintaining a coating with desirable properties.

As mentioned above, the invention improves the holdout of a coated, cellulosic substrate. Cellulose is a natural carbohydrate polysaccharide consisting of anhydroglucose units joined by an oxygen linkage to form long molecular chains, which are essentially linear. See Richard J. Lewis, Sr., *Hawley's Condensed Chemical Dictionary, Thirteenth Edition*, John Wiley & Sons, Inc., New York, 1997. Cellulose substrates include bulk woods of various kinds, and paper that is made from wood pulp, for example. Cellulose may also be used in the manufacture of plastics, fibers, and cotton products (clothing, sheeting, industrial fabrics), for example. The cellulose may also be chemically modified, i.e. chemical groups (carboxyl, alkyl, acetate, nitrate, ether, etc.) may be substituted for the hydroxyl groups along the carbon chain.

The invention may be practiced with a broad variety of substrates, made from various materials, such as wood, plastic, paper or cardboard. Examples of typical substrates may be selected from the group including, but not limited to, substrates such as high density fiber board, medium density fiber board, low density fiber board, cardboard, chipboard, particle board, miniblinds, masonite, cement fiber board and mindy board. In a preferred embodiment, the substrate is a man-made fiber board.

The process of the invention comprises the step of applying a carboxymethyl cellulose acetate butyrate (CMCAB) size composition to the substrate to form a sized substrate. The CMCAB composition will typically be applied as a wet coat, and about 10–20% total solids, including CMCAB, or preferably contain about 12–14% total solids, including CMCAB. The aqueous CMCAB coating composition may be applied by any means known in the art. For instance, the CMCAB coating composition may be applied by spray, or by painting with a brush or a roller, or any other application technique. Other methods known in the art for applying a coating composition are also acceptable.

The CMCAB size composition to be applied to the substrate will comprise certain esters of carboxy($C_1$–$C_3$ alkyl) cellulose, which are useful as components of coating compositions. Such esters preferably have an inherent viscosity of 0.20 to 1.7 dL/g, as measured in a 60/40 (wt./wt.) solution of phenol/tetrachloroethane at 25° C., a degree of substitution per anhydroglucose unit of carboxy($C_1$–$C_3$ alkyl) of about 0.20 to 0.75, and a degree of substitution per anhydroglucose unit of $C_2$–$C_4$ esters of about 1.5 to about 2.7.

As a preferred embodiment, the CMCAB size composition comprises a carboxymethyl cellulose acetate butyrate having a degree of substitution of carboxymethyl of 0.20 to 0.75, preferably 0.25 to 0.35, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65, and having an inherent viscosity of 0.20 to 1.70 dL/g, as measured in a 60/40 (wt./wt.) solution of phenol/tetrachloroethane at 25° C. It is preferred that the degree of substitution per anhydroglucose unit of hydroxyl is 0.10 to 0.70, butyryl is 1.10 to 2.55, and acetyl is 0.10 to 0.90.

The $C_2$–$C_4$ esters of carboxy($C_1$–$C_3$ alkyl) cellulose of the invention may be prepared by any method known in the art. As an example, they may be prepared by the following multi-step process. In this process, the free acid form of, for example, carboxy-methyl cellulose is water activated followed by water displacement via solvent exchange with an alkanoic acid such as acetic acid followed by treatment with a higher aliphatic acid (propionic acid or butyric acid) to give a carboxymethyl cellulose (CMC-H) activate wet with the appropriate aliphatic acid. In this regard, it is preferred that the starting carboxymethyl cellulose be prepared from cellulose with a 95 to 99% alpha content, preferably about 96 to 97% alpha cellulose content. The high alpha content is important for the quality of the final products prepared therefrom.

Next, the CMC-H is treated with the desired anhydride in the presence of a strong acid catalyst such as sulfuric acid to give a fully substituted CMC ester. A final solution (consisting of water and an aliphatic acid) is added slowly to the anhydrous "dope" solution so as to allow removal of combined sulfur from the cellulose backbone. The final addition allows a slow transition through the hydrous point to give period of low water concentration and high temperature (as a result of the exotherm from water reacting with excess anhydride) in the reaction medium. This is crucial for hydrolysis of combined sulfur from the cellulose backbone. This product is then hydrolyzed using sulfuric acid to provide a partially substituted carboxymethyl cellulose ester. Hydrolysis is necessary to provide gel free solutions in organic solvents and to provide better compatibility with other resins in coatings applications.

Next, the sulfuric acid is neutralized after the esterification or hydrolysis reactions are complete by addition of a stoichiometric amount of an alkali or alkaline earth metal alkanoate, for example, magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of carboxy($C_1$–$C_3$ alkyl) cellulose ester are isolated by diluting the final neutralized "dope" with an equal volume of acetic acid followed by precipitation of the diluted "dope" into a volume of water about 1.5 to 3.0 times its weight. This is followed by addition of 1.5 to 3.0 volumes of water to give a particle that can be easily washed with de-ionized water to efficiently remove residual organic acids and inorganic salts. As an alternative isolation, the fully substituted or partially hydrolyzed forms of carboxy($C_1$–$C_3$ alkyl) cellulose ester are isolated by precipitation of the diluted dope by addition of about 2.0 times its volume of 10% aqueous acetic acid, followed by an additional 2.0 times the dope volume of water.

As a preferred embodiment of this process, the reaction mixture is diluted with an equal volume of acetic acid, followed by precipitation of the diluted product into a volume of water about 1.5 to 3.0 times its weight, followed by an additional volume of water about 1.5 to 3.0 times its weight, washed with deionized water and dried to provide the desired product as a powder or granules. This powder is thus free from any significant amount of residual organic acids and inorganic salts.

As an alternative embodiment of this process, the reaction mixture is diluted with an equal volume of acetic acid, followed by precipitation of the diluted product by the addition of about 2.0 times its volume of aqueous acetic acid, followed by about 2.0 times its volume of water, washed with deionized water and dried to provide the desired product as a powder.

The CMCAB size composition may further comprise colorants, i.e. one or more organic or inorganic pigments and/or dyes, including extender pigments. Any colorants known to one of ordinary skill in the art may be used. Typical white pigments include titanium dioxide, zinc oxide, zinc sulfide, white lead, lithophone, and modifications thereof. Black pigments are selected from the group of mineral blacks, bone blacks, iron oxide blacks, and carbon blacks, for example. Inorganic colored pigments include lead chromates, metal oxides, sulfides and sulfoselenides, iron blue, cobalt blue, ultramarine blue, manganese violet, bismuth vanadate, and molybdate yellow, for example. Examples of organic colored pigments include metallized azo reds including lithol reds, permanent red 2B, lithol rubine red, BON reds, BON maroon-nonmetallized azo reds including toluidine red, para reds, napthol reds, quinacridone reds, vat reds, anthraquinone red, brominated pyranthrone red, perylene reds, benzimidazolon based reds, diazo condensation reds, thioindigoid reds, pigment red 251, 252, and 257. Blue pigments include, but are not limited to, copper phthalocyanine blues, indanthrone blue, and carbazole violet. Examples of yellow pigments include monoarylide yellows, diarylide yellows, benzimidazolone yellows, and heterocyclic yellows. Orange pigments include azo-based oranges, bisazo-based oranges, bisazo condensation-based oranges, perinone type orange, quinacridone type orange, pyranthrone type orange, heterocyclic hydroxy-based orange, and pyrazoloquinazolone-based orange. Examples of green pigments include copper phthalocyanine greens, and triphenylmethane-phospho tungsto molybdic acid (PTMA) complexes. Extender pigments include calcium carbonate, kaolin or china clay, talc, silica, mica, barium sulfate, wollastonite, sodium aluminosilicates, alumina trihydrate, and aluminum oxide. Metallic Pigments include, but are not limited to, aluminum, zinc, gold, bronze, nickel, and stainless steel. Examples of pearlescent pigments, include titanium dioxide and ferric oxide coatings on mica, bismuth oxychloride crystals grown from a solution of bismuth salts, natural pearl essence, guanine, and hypoxanthane purines from fish scales. This list is not meant to be exclusive.

Dyes that might be used are included in the following classes, i.e., Acid dyes, Azoic Coupling Components, Azoic Diazoic Components, Basic dyes, Direct Dyes, Reactive dyes, Solubilized Vat Dyes, Solvent Dyes, Sulfur Dyes, Vat Dyes, and Aniline Dyes. Specific dyes by C.I. number and dyes of both domestic and foreign manufacture can be found in the Colour index and its Additions and Amendments, published jointly by the American Association of Textile Chemist and Colorists, Research Triangle Park, NC and The Society of Dyers and Colourists in Bradford, England. Other suitable pigments and dyes are known in the art. Pigment dispersions may be prepared by blending the cellulose ester and a pigment with heat and/or shear to disperse the pigment. In this manner, pigments can be easily dispersed in coating formulations, thereby providing high coloring power and good transparency while using a minimal amount of pigment.

Mixtures of carboxymethylcellulose (CMC) esters and pigments may be prepared at pigment to ester ratios of from about 10:90 to about 90:10 weight percent. In a high shear environment, such as when using organic pigments, it is preferable to use pigments in an amount from about 10 to 20 weight percent, and esters in an amount from about 90 to 80 weight percent. These dispersions may be prepared on two-roll mill, ball mill, Kady mill, sand mill, Cowles mixers, and the like. For pigments requiring gentle agitation or prepared in a low shear environment, the pigments may be present in an amount from about 50 to 90 weight percent and the $C_2$–$C_4$ esters of carboxy($C_1$–$C_3$ alkyl) cellulose in an amount from about 50 to 10 weight percent. A typical pigment dispersion may be formed by blending either a solution or a dispersion of the esters with the pigment with the necessary shear required in order to disperse the pigment.

The coatings may be applied to a substrate in the form of an organic solvent solution, an amine neutralized water-borne dispersion, a fully neutralized aqueous/organic colloidal dispersion, or as a zero VOC-exempt solvent dispersion in acetone with aqueous ammonia. The coatings may also act as a protective coating for a variety of substrates, especially metal and wood.

Some examples of typical solvents include: acetone, methyl ethyl ketone, methyl isobutyl ketone, methyl amyl ketone, methyl isoamyl ketone, 2-propoxy-ethanol, 2-butoxyethanol, ethyl 3-ethoxypropionate, 2-butanone, methanol, ethanol, propanol, isopropyl alcohol, butanol, 2-ethyl-hexanol, ethyl acetate, propyl acetate, isopropyl acetate, butyl acetate, isobutyl acetate, ethyl ether, propyl ether, propyl glycol butyl ether, diethylene glycol methyl ether, diethylene glycol ethyl ether, diethylene glycol butyl ether, dipropylene glycol ether, dipropylene glycol methyl ether, ethylene glycol, ethylene glycol butyl ether, ethylene glycol diethyl ether, ethylene glycol dimethyl ether, ethylene glycol ethyl ether, ethylene glycol 2-ethylhexyl ether, ethylene glycol methyl ether, ethylene glycol phenyl ether, 1-methyl-2-pyrrolidinone, ethylene glycol diacetate, ethylene glycol monoethyl ether, ethylene glycol monopropyl ether, ethylene glycol monobutyl ether, ethyl ether, propylene glycol butyl ether, propylene glycol dimethyl ether, propylene glycol ethyl ether acetate, propylene glycol methyl ether, propylene glycol ethyl ether, propylene glycol propyl ether, propylene glycol butyl ether, propylene glycol methyl ether acetate, propylene glycol phenyl ether, propylene glycol propyl ether, propylene glycol, tripropylene ethyl ether, triethylene glycol, tri(ethylene glycol) dimethyl ether, and mixtures thereof.

Other volatile inert solvents typically used in coating compositions may also be added, as will be apparent to one of ordinary skill in the art. Typically, the amount of solvent will be adjusted in order to dissolve and/or suspend the various components of the composition in a uniform liquid suspension or liquid. As an example, organic solutions of the esters of this invention may be prepared by adding 1 to 1000 parts of solvent per part of ester; 1.5 to 9 parts of solvent per part of ester is preferred. In an embodiment of the invention, the CMCAB precoat or size composition will be aqueous, which will reduce VOCs.

The CMCAB esters used in the invention possess free hydroxyl groups and thus can also be utilized in conjunction with crosslinking agents such as melamines and isocyanates. Such melamines are preferably compounds having a plurality of —N(CH$_2$OR)$_2$ functional groups, wherein R is $C_1$–$C_4$ alkyl, preferably methyl. In general, the melamine cross-linking agent may be selected from those known in the art. Examples of crosslinking agents include hexamethoxymethylmelamine, tetramethoxymethylbenzoguanamine, tetramethoxymethylurea, mixed butoxy/methoxy substituted melamines, and the like. The most preferred melamine cross-linking agent is hexamethoxymethylmelamine and urea-formaldehyde. Typical isocyanate crosslinking agents and resin include hexamethylene diisocyanate (HMDI), isophorone diisocyanate (IPDI), and toluene diisocyanate, and their adducts.

Since there are free —COOH groups present on the CMCAB esters, one could use the usual crosslinkers and resins used with carboxyl functional resins, e.g., epoxy resins or glycidyl-functional resins. Preferred epoxy functional resins generally have a molecular weight of about 300 to about 4000, and have approximately 0.05 to about 0.99 epoxy groups per 100 g of resin (i.e., 100–2000 weight per epoxy (WPE)). Such resins are widely known and are commercially available under the EPON™ trademark of the Shell Chemical Company, the ARALDITE™ trademark of CIBA-Geigy, and D.E.R. resins of the Dow Chemical Company. Other examples of resins include polyester resins, including water extended polyesters, polystyrene, vinyl resins including polyvinylacetate, polyvinylchloride, vinylchloride-vinylacetate copolymers and the like; polyamide resins, polyurea resins, and acrylic resins; phenolic resins, maleic resins, coumerone-indene resins, urea-formaldehyde; melamine-formaldehyde resins; epoxy resins, silicone resins, ionomer resins, acetal resins, polyethylene, polypropylene, hydrocarbon resins, rubber derivatives, polycarbonate resins, phenoxy resins, fluorol plastics, styrene-butadiene resins, polyurethane resins, furane resins, polysulfone resins, pentaerythritol resins, ester gum, co-polyesters, UV-curable oligomers with corresponding photoinitiators, and the like. Natural resins which may be used include shellac, rosin, copal resins, damar resins, manila resins and the like.

The precoat or size compositions of the invention may also contain one or more coatings additives, typically used in the art. Such additives are generally present in a range of about 0.1 to 15 weight percent, based on the total weight of the composition. Examples of such coatings additives include waxes, leveling, flow control agents and rheology modifiers such as silicones, clays, fluorocarbons, cellulosics, and organic rheology modifiers such as acrylics, and mixtures thereof, flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in Raw Materials Index, published by the National Paint & Coatings Association, 1500 Rhode Island Avenue, N.W., Washington, D.C. 20005. Examples of flatting agents include synthetic silica, available from the Davison Chemical Division of W. R. Grace & Company under the trademark SYLOID™; polypropylene, available from Hercules Inc., under the trademark HERCOFLAT™; synthetic silicate, available from J. M Huber Corporation under the trademark ZEOLEX™.

Coating compositions of the invention may also contain any compatible plasticizer known in the art. Examples of plasticizers include, but are not limited to, 2,2,4-trimethyl-1,3-pentanediol diisobutyrate, diisonyl phthalate, dioctyl phthalate, butyl benzyl phthalate, dibuty phthalate, diethylene glycol, dioctyl terephthalate, and mixtures thereof. Preferred plasticizers include TXIB (2,2,4-trimethyl-1,3-pentanediol diisobutyrate, commercially available from Eastman Chemical Company as Texanol Isobutyrate™), DINP (diisononyl phthalate, commercially available from Exxon Mobile Chemical Company), DOP (dioctyl phthalate, commercially available from Eastman Chemical Company), BBP (butyl benzyl phthalate, commercially available from Solutia, Inc.), DBP (dibutyl phthalate, commercially available from Eastman Chemical Company), EMN-425 (a blend of 75/25 DOTP/benzoate ester, commercially available from Eastman Chemical Company), DOA (dioctyl adipate), and TEG-2EH (triethylene glycol di-2-ethylhexanoate).

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxyethyl)-N-octadecyl sulfosuccinnamate, disodium N-octasulfo-succinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA™. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK™ trademark of BYK Chemie, U.S.A., under the FOAMASTER™ and NOPCO™ trademarks of Henkel Corp./Coating Chemicals, under the DREWPLUS™ trademark of the Drew Industrial Division of Ashland Chemical Company, under the TROYSOL™ and TROYKYD™ trademarks of Troy Chemical Corporation, and under the SAG™ trademark of Union Carbide Corporation.

Examples of fungicides, mildewcides, and biocides include 1,2-benziosthiazolin-3-one, 4,4-dimethyloxazolidine, 3,4,4-trimethyloxazolidine, modified barium metaborate, potassium N-hydroxy-methyl-N-methyldithiocarbamate, 2-(thiocyanomethylthio)benzothiazole, potassium dimethyl dithio-carbamate, adamantane, N-trichloro-methylthio) phthalimide, 2,4,5,6-tetra-chloroisophthalo-nitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename Cyasorb UV, and available from Ciba Geigy under the trademark TINUVIN, and diethyl-3-acetyl-4hydroxy-benzyl-phosphonate, 4-dodecyl-oxy-2-hydroxy benzophenone, and resorcinol monobenzoate.

To prepare the coated articles using the precoat or size compositions of the invention, the formulated coating composition containing carboxy($C_1$–$C_3$ alkyl) cellulose esters of the invention is applied to a substrate and allowed to dry. The substrate can be, for example, wood; plastic; metal such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

After the aqueous CMCAB size composition is applied, the coated, sized substrate is then dried by any means known in the art. Typical drying methods include providing combinations of heat and/or air and/or UV light in order to speed the rate of drying.

The invention may further comprise the optional step of applying one or more overcoats to the substrate. Any compatible overcoat may be used, including both clear and pigmented overcoats. Examples of overcoats include, but are not limited to: UV-curable clearcoats, aqueous primer, enamel topcoats, thermoplastic overcoats, thermosetting overcoats, polyurethane overcoats, aqueous UV coatings, lacquer, acid-curable overcoats, nitrocellulose overcoats, and the like. The overcoat may be applied by any acceptable method known in the art, i.e. application by spraying or coating. In addition, the overcoat, in the form of a powder, may be spayed on to the substrate by well known electrostatic powder spray techniques, such as corona discharge or triboelctric electrostatic spray techniques. Other suitable overcoatings are known in the art.

The invention also relates to a coated, man-made fiber substrate comprising a man-made fiber substrate, a CMCAB coating, and an overcoat. The substrates, CMCAB coating, and the overcoat are as described elsewhere in the application. The invention also relates to a sized substrate that contains CMCAB as a size. The CMCAB may be used as either an external size or an internal size. When used as an external size, the CMCAB size composition will be applied to the substrate by any means known in the art, such as spraying or by applying with a brush or roller. In the case of an internal CMCAB size, the size is incorporated into the substrate, typically at the processing stage, i.e. added to fibers or pulp mixtures, and then formulated into the substrate.

EXAMPLES

The practice of the invention is disclosed in the following examples, which should not be construed to limit the invention in any way.

Preparation of CMCAB Esters

CMCAB esters usable in this invention may be prepared as described in U.S. Pat. No. 5,994,530, which is hereby incorporated in its entirety. The CMCAB esters used in the following examples were prepared according to the following description.

Carboxymethyl cellulose, sodium salt form (CMC-Na)), (approximately 0.35 DS carboxymethyl based on final product calculations) was converted to the free acid (CMC-H) by adding 100 grams of CMC-Na)(about 70% CMC-Na by wt.) to 2100 grams of about 2% to about 6% sulfuric acid. After about 2 to 5 minutes, the sample was filtered free of excess liquids and washed with demineralized water. The protonated CMC-H was transferred to a glass fritted funnel and excess water removed. The activate was dewatered by solvent exchange with three 250 gram portions of acetic acid and three 250 gram portions of butyric acid to give butyric acid wet CMC-H activate (about 15 to 40 wt % solids). The activate was transferred to a 2 liter round bottom flask and chilled in ice for 1 hour. The activate was esterified by treating with 264 grams of butyric anhydride, 30 grams of acetic anhydride, and 2.94 grams of sulfuric acid at 0° C. The reaction was allowed to warm as a result of the exotherm and proceeded to dissolution after 2.1 hours at 45° C. (additional heat was required to hold the temperature at 43° C.). A solution of 74 grams of water and 74 grams of acetic acid was added dropwise to the reaction mixture over 30 minutes generating an exotherm of approximately 15° C. as a result of reaction of excess anhydride with water. The contents were hydrolyzed by heating to 60° C. for 4.5 hours. The sulfuric acid catalyst was then neutralized by the addition of 7.1 grams of magnesium acetate (tetrahydrate) in 20 mL of water and 19 mL of acetic acid. The reaction contents were diluted with an equal weight of acetic acid and precipitated by adding 3,000 mL of 10% aqueous acetic acid. The precipitated particles were hardened by the addition of 3,000 mL of water. The contents were filtered, washed with de-ionized water, and dried to obtain 106 grams of the protonated form of carboxymethyl cellulose acetate butyrate as a white granular powder: GC % acetyl 6.38, GC % butyryl 39.52%; acid number 58.0; PPM sulfur 39; molecular weight number average 84,700; inherent viscosity (IV) 1.02 dL/g (60/40 wt./wt. solution of phenol/tetrachloroethane at 25° C.). Calculation for degree of substitution (DS) gives: carboxymethyl 0.35, acetyl 0.50, butyryl 1.88, and hydroxyl 0.27. A highly preferred method for preparation of CMCAB esters is as follows:

1. Conversion of Carboxymethyl Cellulose-Sodium Salt to the Acid Form:

CMC-Na was converted to the free acid by the addition of 100 grams of carboxymethyl cellulose to 2–16% aqueous sulfuric acid at 27–60° C. The solids content of the resulting slurry was about 6%. The slurry was stirred for about 15 minutes and the acid solution was filtered to recover CMC-H.

2. Activation of CMC (CMC-H):

CMC-H was washed in water with stirring for 5 minutes to 1 hour. The water was drained to approximately 20% solids. The water-wet CMC-H was dewatered by washing 3 times with 200–500 grams of acetic acid followed by 3 washes with 200–500 grams of butyric acid. In between each wash the sample was drained to approximately 16–18% solids. After the final butyric acid wash, vacuum was applied to obtain the butyric acid wet CMC-H activate at 15–40% solids.

3. Esterification:

The butyric acid wet CMC-H was combined with 31 grams of acetic anhydride, and 253 grams of butyric anhydride at 0° C. A catalyst solution consisting of 3.44 grams of sulfuric acid in 3.44 grams of acetic acid was added slowly to the reaction mixture keeping the temperature below 30° C. After completion of the catalyst addition, the temperature was ramped from 30° C. to 35° C. over 150 minutes. The temperature was then ramped from 35° to 45° C. over a 60 minute period. The reaction mass was heated at 45° C. until complete dissolution of the solids to an acid dope.

4. Hydrolysis:

A solution of 95 grams of water and 95 grams of acetic acid was added to the acid dope over 30–45 minutes at 40–45° C. thereby adjusting the water concentration to 13–14%. The temperature was increased to 70° C. and held for 2 hours. Then, 7.53 grams of magnesium acetate (tetrahydrate) in 25 grams of water and 25 grams of acetic acid was added to neutralize the strong acid catalyst.

5. Filtration:

The resulting dope was diluted with acetic acid and water to give about a 1:1 ratio of acetyl/butyryl and approximately 20% water concentration. The acid dope was held at 65° C. and circulated through a 0.5 micron filter to remove any particulates.

6. Precipitation:

The dope from above was added to water with agitation to give a flake precipitate. This material was allowed to harden, washed with water, and dried at 60° C. An optional precipitation method is to add 10% aqueous acetic in sufficient volume to yield about 30% organic acid in the final precipitation bath followed by the addition of an equal amount of water. The precipitate is then washed with water, and dried at 60° C. This yields a CMCAB with the following general analysis (methods of analysis described below): Acid number 55–60, PPM Sulfur 25–100 PPM, IV (60/40 (wt./wt.) solution of phenol/tetrachloroethane at 25° C.) 0.5–0.7 dL/g, DS of carboxymethyl groups 0.30–0.35, acetyl 0.4–0.6, butyryl 1.7–2.05, and hydroxyl of 0.1–0.6.

Determination of Acid Number

The acid number of a carboxy($C_1$–$C_3$ alkyl) cellulose ester was determined by titration as follows. An accurately weighted aliquot (0.5–1.0 g) of the carboxy($C_1$–$C_3$ alkyl) cellulose ester was mixed with 50 mL of pyridine and stirred. To this mixture was added 40 mL of acetone followed by stirring. Finally, 20 mL of water was added and the mixture stirred again. This mixture was titrated with 0.1N sodium hydroxide in water using a glass/combination electrode. A blank consisting of 50 mL pyridine, 40 mL of acetone and 20 mL water was also titrated. The acid number was calculated as follows where:

Ep=mL NaOH solution to reach end point of sample

B=mL NaOH solution to reach end point of blank

N=normality of sodium hydroxide solution

Wt.=weight of carboxy($C_1$–$C_3$ alkyl) cellulose ester titrated $$\text{Acid Number (mg KOH/g sample)} = ((Ep-B)*N*56.1)/Wt.$$

Determination of Acetyl Propionyl, and Butyryl Weight Percents

The acetyl, propionyl, and butyryl weight percents were determined by a hydrolysis GC method. In this method, about 1 g of ester was weighed into a weighing bottle and dried in a vacuum oven at 105° C. for at least 30 minutes. Then 0.500+/−0.001 g of sample was weighed into a 250 mL Erlenmyer flask. To this flask was added 50 mL of a solution of 9.16 g isovaleric acid, 99%, in 2000 mL pyridine. This mixture was heated to reflux for about 10 minutes after which 30 mL of methanolic potassium hydroxide solution was added. This mixture was heated at reflux for about 10 minutes. This mixture was allowed to cool with stirring for 20 minutes and then 3 mL of concentrated hydrochloric acid was added. The mixture was stirred for 5 minutes and then allowed to settle for 5 minutes. About 3 mL of solution was transferred to a centrifuge tube and centrifuged for about 5 minutes. The liquid was analyzed by GC (split injection and flame ionization detector) with a 25M×0.53 mm fused silica column with 1 micron FFAP phase. The weight percent acyl was calculated as follows where:

$C_i$=concentration of I(acyl group)
$F_i$=relative response factor for component I
$F_s$=relative response factor for isovaleric acid
$A_i$=area of component I
$A_s$=area of isovaleric acid
R=(grams of isovaleric acid)/(g sample)

$$C_i=((F_i*A_i)/F_s*A_s))*R*100$$

This GC method was used instead of NMR because the methylene of the carboxymethyl group cannot be separated from the ring protons of the cellulose backbone making absolute DS measurements by NMR difficult. The DS values were calculated by converting the acid number to percent carboxymethyl.

Formulations

Formulation A: This CMCAB dispersion was made by combining 10 g EB (ethylene glycol monobutyl ether, commercially available from Eastman Chemical Company), 20 g MPK (methyl propyl ketone, commercially available from Eastman Chemical Company), 36 g anhydrous isopropanol, and 28 g (0.0299465 acid equivalents) CMCAB. These components were mixed until all the ingredients were dissolved, and then 5.64 g (75% acid equivalents) CARDURA E-10™ (commercially available from Shell Chemical, Houston, Tex.) was added. The mixture was mixed until it was smooth, and then 0.4 g DMEA (N,N-dimethylethanolamine) was added. After mixing for 15 minutes, 94 g of water was added with a dropper. After addition of the water, the dispersion became very smooth. The pH of the resulting dispersion was about 5.08.

Formulation B: This formulation was made to investigate the use of COATOSIL 1770™, (commercially available from Witco Corp., Friendly, W. Va.) an epoxy silane, as a carboxyl-neutralizing agent and as an internal formaldehyde-free crosslinking agent. The silanated CMCAB dispersion was made by combining 10 g EB (ethylene glycol monobutyl ether, commercially available from Eastman Chemical Company), 20 g MPK (methyl propyl ketone, commercially available from Eastman Chemical Company), 36 g anhydrous isopropanol, and 28 g (0.0299465 carboxy equivalents) CMCAB. These components were mixed until all the ingredients were dissolved, and then 6.48 g (75% carboxyl equivalents) COATOSIL 1770™ was added. The mixture was mixed until it was smooth, and then 0.4 g DMEA (N,N-dimethylethanolamine) was added. After mixing for 15 minutes, 94 g was water was added with a dropper. The solution inverts relatively easily upon addition of water, i.e. goes from a solvent continuous phase to a water continuous phase, and the dispersion becomes very smooth. The pH of the resulting dispersion is about 5.16.

Formulation C: This CMCAB dispersion was made by combining 10 g EB (ethylene glycol butyl ether, commercially available from Eastman Chemical Company), 20 g MPK (methyl propyl ketone, commercially available from Eastman Chemical Company), 36 g anhydrous isopropanol, and 28 g (0.0299465 acid equivalents) CMCAB. These components were mixed until all the ingredients were dissolved, and then 6.48 g of Santicizer 160™ (commercially available from Solutia, St. Louis, Mo.) was added. The mixture was mixed until it was smooth, and then 0.4 g DMEA (N,N-dimethylethanolamine) was added. After mixing for 15 minutes, 94 g of water was added with a dropper. After addition of the water, the dispersion became very smooth.

Tests

Detergent Spot Test

The detergent spot test was conducted by first placing a cotton ball on the substrate. The cotton ball was then saturated with a 0.5% wt/wt solution of liquid Ultra Palmolive (green) dish detergent in distilled water. The detergent saturated cotton ball was then covered with a watch glass or some other appropriate item for the time specified. After the specified exposure time, the saturated cotton ball was removed and the exposed area was wiped with a soft cloth and tap water. The exposed area was observed immediately and after a specified recovery period for whitening, darkening, cracking, peeling, or any other surface defect that was not present before the test was conducted. If specified, the exposed area may have also been evaluated for softening.

Nickel Adhesion Test

The Nickel adhesion test was conducted by placing a nickel in contact with the coated substrate at about a 45-degree angle so that the sharp edge of the nickel was in contact with the coating surface. The nickel was then pulled toward the operator at a moderate rate and with moderate to heavy pressure. The scraped coating area was observed for delamination/whitening, surface mar and/or coating removal, i.e. topcoating removal from undercoating or removal of the entire coating system from the substrate.

Tape Adhesion Test (ASTM D3359)

The tape adhesion test was conducted according to the specification of ASTM D3359, which is hereby incorporated by reference. The test was conducted by making 2 sets of 6 parallel cuts (spaced 2 mm apart), at right angles to one another, into the coated substrate with sufficient pressure to just go through the coating to the substrate. A cutting tool kit purchased from Paul N. Gardner Co. of Pompano Beach, Fla. was used. After making the crosshatched cuts into the coated substrate, the cut area was brushed clean of loose coating debris and 1-inch width Permacel tape was pressed onto the crosshatched area and pressure applied with a plastic bar in order to assure intimate contact of the tape with the cut area. The tape was then removed from the surface at about a 90-degree angle with a medium but uniform motion. The area was observed for removal of coating from the substrate and/or release of topcoating layers from interior coating layers. Results were reported as follows:

| | |
|---|---|
| 5B | no (0%) area removed |
| 4B | less than 5% area removed |

-continued

| 3B | 5–15% area removed |
| 2B | 15–35% area removed |
| 1B | 35–65% area removed |
| 0B | greater than 65% area removed |

The tested area was compared to pictorial depictions given in the ASTM D3359 standard for results. Results may also be described on a scale from "Excellent", "Very Good", "Good", "Poor" to "Very poor".

MEK Double Rub Test

The MEK double rub test was conducted by rubbing a MEK (methyl ethyl ketone) saturated cloth across the surface of the cured coating with moderate pressure. One back and forth motion was designated as 1 double rub (DRS). Rubs are continued until approximately 90% or more of the coating is removed from the substrate. The cloth was occasionally rewet with MEK (usually at least every 50 DRS in our test). Typically, MEK DRS of the sample was recorded in one of the following two ways:
(1) The midpoint of a MEK DRS range taken from the value of DRS at onset of coating failure by removal from the substrate and the DRS value at complete failure indicated by complete removal of the coating from the substrate.
(2) The entire range from onset of coating failure to complete coating removal.
At times, the onset of coating downglossing may also be recorded.

EXAMPLES

Example 1a

Two 3 mil drawdowns on leneta sag charts were made using Formulations B and A. The applied coatings were air-dried overnight. Both samples formed a clear and glossy film. Formulation B seemed harder and had improved mar resistance. After 6 days, the mar resistance of Formulation B does not seem as good as it was previously. After drying, overnight MEK (methyl ethyl ketone) double rubs reveal that Formulation A lifts at 1 double rub, while Formulation B displays severe lift at 15–25 double rubs. After six days, MEK rubs reveal that Formulation A lifts at 1–5 double rubs, and Formulation B displays severe lift at 25–35 double rubs.

Example 1b

Two 3 mil drawdowns on leneta sag charts were made using Formulations B and A. The substrates were dried overnight in a 120° F. oven. Both samples seem to show a wrinkly or micro-cracking effect, particularly with Formulation A.

Formulation A mars easily. Formulation B mars easily, although slightly better than Formulation A; and overall hardness is a little better than Formulation A; these properties however, do not appear as good as the room temperature dried sample, described in Example 1(a).

After six days both samples continue to mar; however, Formulation B may be slightly better. Overnight MEK rubs reveal that Formulation A lifts at 3 double rubs, and Formulation B lifts at 37 double rubs.

These results were compared to substrates that were not dried in the oven. After six days, MEK double rubs for the sample that were not dried in the oven reveal that Formulation A lifts at 1–5 double rubs, and Formulation B exhibits severe lift at 35–45 double rubs.

These results indicate that there is some definite crosslinking taking place with the Formulation B sample compared to the Formulation A sample.

Example 2

Formulation B was investigated as an aqueous size over MDF (medium density fiber board), with a white aqueous acid cure system, applied as an overcoat.

Back of Substrate

The back of a panel was sprayed with Formulation B, as a wet coat. Formulation B sprays very well. The panel was air-dried for 10 minutes, and heated for 5 minutes at 200° F., and then cooled for 10 minutes. The substrate was dry coming out of the oven.

Front of Substrate

Half of the front of the substrate (including the edges) was sprayed with Formulation B. The substrate was air dried for 10 minutes, heated for 5 minutes at 200° F., and then cooled for 15 minutes. Both the back and front of the substrate show very little fiber raising. The entire front of the substrate was aggressively sanded with 220 stearated paper. An aqueous acid cure primer is sprayed over the entire front. There is a significant difference in holdout between the treated and non-treated sides of the panel. The treated side displayed excellent holdout, and essentially very little to no fiber popping. The substrate is then air-dried for 20 minutes, followed by heating for 10 minutes at 200° F.

Example 3

Formulation B was investigated as an aqueous size over MDF (medium density fiber board), with a white aqueous acid cure system, applied as an overcoat.

The back of a panel was sprayed with Formulation B, air-dried for 10 minutes, heated for 5 minutes at 200° F., and cooled for 15 minutes. Half of the front of the panel was sprayed with Formulation B, air-dried for 10 minutes, heated for 5 minutes at 200° F., and cooled for 15 minutes. The front of the panel was sanded aggressively 220 stearated sand paper. Next the front of the panel was sprayed with an aqueous, acid-cure, white primer. The panel was allowed to air dry for 20 minutes. The side treated with Formulation B shows excellent holdout. The substrate is heated for 10 minutes at 200° F. When the substrate was taken out of the oven, the primer on the portion of the panel that had been treated with Formulation B had a somewhat better cure. The primed substrate was cooled for 20 minutes, and then sanded using a fine sanding sponge. The panel that had been treated with Formulation B seemed to cause the sponge to slide very easily, without as much cut through. The panel was sprayed with an aqueous, acid-cure, white primer again, air-dried for 20 minutes, heated for 10 minutes at 200° F., and cooled for 20 minutes. Again, the sample that had been sized with Formulation B has substantially better holdout. The panel was sanded using a fine sanding sponge. An aqueous acid cure enamel was sprayed on the panel. The panel was air-dried for 20 minutes, and then heated for 10 minutes at 200° F. Although the enamel displayed an orange-peel like surface defect, the sized portion of the panel had improved holdout and/or cure than the non-sized panel.

The adhesion was investigated after six days. These results are summarized in Table 1 below.

TABLE 1

ADHESION AFTER 6 DAYS:

| | Non-sized portion of panel | Portion of panel sized with Formulation B |
|---|---|---|
| Tape adhesion | Good but cuts very brittle with some substrate being lost | Good but cuts very brittle with some substrate being lost |
| Nickel adhesion | Excellent | Excellent, but definitely better nickel mark resistance |

These results seem to indicate that the COATOSIL 1770™/CMCAB blend seems to make a significant difference in the holdout and processing of the acid cure primer/enamel over MDF.

Example 4

This experiment was conducted to evaluate the effect of using Formulation C (CMCAB-based size coat) as a size on Masonite fiberboard. The screen-back Masonite panels described in Table 2 were studied.

TABLE 2

USE OF CMCAB SIZE COAT ON SCREEN BACK MASONITE

| Operation | Non-sized panel | Panel 1 - Sized | Uncoated Masonite |
|---|---|---|---|
| Spray size coat | N/A | Formulation C | N/A |
| Cure | | Air dry 5 min, then 10 min at 66 C., and cooled overnight Initially, the sized portion of the Masonite appears a little swollen or increased in thickness relative to the non-sized portion of the panel | |
| Preheat panel, 30 sec at 250 F. | | | N/A |
| Primer/Basecoat applied by roller at temperature of about 78° F. | | | N/A |
| Cure | Flash 60 sec, 3 min at 250 F. | | N/A |
| Comments | | the aqueous thermoplastic primer-based coating has significantly better holdout and coverage on this panel than on the non-sized panel. However, it is also more tacky out the oven. | |
| Age panels 24 ½ hours at 66 C., cool 19 hours | | | N/A |
| Applied covered detergent spot test for 24 hours | | | |
| Initial results | Slight swell (surprisingly good considering coverage, but definitely worse than the CMCAB-sized panel) | Very slight-slight swell. Definitely better than the non-CMCAB-sized panel | Severe swelling and within a very short period of time |
| Recovered results | Slight swell and slight discoloration | Very slight swell | |
| Scotch tape X adhesion | Excellent | Excellent | N/A |

Example 5

The substrate was a MDF drawer front. The entire back of the substrate (not including the edges) was sprayed with Formulation C. The substrate was air-dried for 10 minutes, heated for 5 minutes at 66° C., and then cooled for 20 minutes.

Half of the front of the panel, including the edges, was sprayed with Formulation C as a size coat. The substrate was air-dried for 10 minutes, heated for 5 minutes at 66° C., and then cooled overnight. (Note: Before putting the substrate in the oven, a semi-burnt appearance on surface was noticed, that was not on the back, which may be due to some wax on/in panel.) After cooling overnight, the back and edges were sanded aggressively using 220 stearated sand paper. The back of the substrate was sprayed using an aqueous, thermoplastic primer, which sprayed well, but with some orange peel-like surface defect. The primed substrate was air-dried for 20 minutes, heated for 10 minutes at 66° C., and cooled for 10 minutes. There was very little fiber pop. The substrate was sanded using 320 stearated sand paper, resulting in caking of the paper. No cut off of any raised fiber was observed. Edges with formulation C have much better holdout at this point. The back of the substrate was sprayed using primer, which sprayed well. The primed substrate was air-dried for 20 minutes, heated for 10 minutes at 66° C., and cooled for 10 minutes. The substrate looked good.

The entire drawer front was aggressively sanded using 220 stearated sand paper. An aqueous, thermoplastic primer was applied, which sprayed well. The primer dried faster and fiber pop (particularly in routing areas) is much better for the sized portion of the panel. The panel was air-dried for 20 minutes, heated for 10 minutes at 66° C., and cooled for 10 minutes. When taken out of the oven, the side that was sized with the CMCAB formulation was smoother and had better holdout. The CMCAB-sized portion of the panel is also significantly easier to smooth—particularly in the routing areas and corners.

A second layer of aqueous, thermoplastic primer was applied, which sprayed well despite a slight orange peel in wet. The panel was air-dried for 20 minutes, heated for 10 minutes at 66° C., and cooled for 1.5 hours. The sized portion looked better than the non-sized portion.

A layer of an aqueous, thermoplastic enamel was applied. The non-sized portion appeared to be dry-sprayed relative to the sized portion, i e. the non-sized portion does not have adequate coverage. The substrate was air-dried for 20 minutes, and then heated for 10 minutes at 66° C.

Example 6

The substrate is a MDF Drawer Front. This example is carried out at 22° C. and 35% relative humidity. The entire back, (but not the edges), of the substrate was sprayed with Formulation C as the size. The substrate was allowed to air dry for 10 minutes, heated for 5 minutes at 66° C., and then cooled for over 20 minutes.

Half of the front of the drawer, and the edges, was sprayed using Formulation C size. The substrate was allowed to air dry for 10 minutes, heated for 5 minutes at 66° C., and then cooled for over 20 minutes.

The back was sanded aggressively using 220 stearated sand paper. The back was sprayed with aqueous thermoplastic primer. The primed substrate was allowed to air dry for 20 minutes, heated for 10 minutes at 66° C., and then cooled for over 10 minutes. Very little fiber pop was seen. The substrate was sanded with 320 stearated sand paper. Some caking and a very small amount of fiber cut off was observed. The back of the substrate was sprayed a second time with an aqueous, thermoplastic primer. A few air bubbles were observed on the substrate in the wet paint. The substrate was allowed to air dry for 20 minutes, heated for 10 minutes at 66° C., and then cooled for about 30 minutes.

The entire front was aggressively sanded using 220 stearated sand paper. The substrate was then sprayed with an aqueous, thermoplastic primer. The sized side has significantly better fiber raise resistance. The primed substrate was allowed to air dry for 20 minutes, heated for 10 minutes at 66° C., and then cooled for 10 minutes. The primed substrate was sanded using a 3M fine sanding sponge. The sized portion sands smoother with no fiber cut off, particularly in routing areas. The primed substrate was then sprayed a second time using an aqueous, thermoplastic primer. The primed substrate was allowed to air dry for 20 minutes, heated for 10 minutes at 66° C., and then cooled for over 10 minutes. The primed substrate was sanded using a 3M fine sanding sponge. The primed substrate was then sprayed with an aqueous, thermoplastic enamel. The enameled substrate was allowed to air dry for 20 minutes, and heated for 10 minutes at 66° C. The panel looked good; however, the surface has a fine surface texture.

Example 7

This experiment was conducted to evaluate the impact of size composition on cold crack resistance when over coated with a rather "short" pigmented nitrocellulose based coating. Table 3 summarizes the size compositions of this study in terms of percent pigment, percent solids of the total size, and vehicle analysis of the size evaluated in terms of CMCAB/plasticizer ratio and the respective cold check resistance results obtained. Substrate—Medium density fiberboard.

TABLE 7

Effect of Size Composition on Cold Check Resistance of a Pigmented Nitrocellulose Lacquer Overcoat.

| Size Formulation → | None | Formulation D | Formulation E | Formulation F | Formulation G | Formulation H | Formulation I |
|---|---|---|---|---|---|---|---|
| % Pigment | N/A | 10 | 0 | 0 | 8.8 | 9.6 | 0 |
| % Solids | N/A | 25 | 17.7 | 22.3 | 29 | 23.0 | 14.8 |
| Vehicle Analysis | | | | | | | |
| CMCAB | N/A | 81% | 81% | 60 | 61 | 100 | 100 |
| Santicizer 160 | N/A | 19% | 19% | 40 | 39 | 0 | 0 |
| # Cold Cycles Passed | | | | | | | |
| 3 coats lacquer | 18 | 4 | 20+ | 20+ | 20+ | 20+ | 20+ |
| 5 coats lacquer | 7 | 3 | 8 | 20 | 14 | 1 and/or 11 | 2? With no further failure |
| Comments | | | | | | 5-coats had a small crack or craze at 1$^{st}$ and 11$^{th}$ cycle | 5-coats small crack ~1/2 inch on 2$^{nd}$ cycle, then no further failure |

These results indicate that Formulation F seems to offer the best cold check resistance. This indicates that increasing the level of plasticizer in the formulation improves cold check resistance. Incorporation of clay pigment seems to hurt cold check resistance.

Cold Check Test:

The cold check test was performed by placing the finished panels into a 150F oven for 1 hour, then placing the warm panels into a 0F freezer for 1 hour. The cold panels were allowed to sit at room temperature for 20 minutes and then evaluated for cracking. This represented 1 cycle.

Based on these results, it appears that properly formulated CMCAB may make an effective size coating on man-made fibrous boards to yield the following benefits: improved coating holdout, reduction in fiber raising when coated with aqueous coatings, improved system resistance to moisture, reduction in amount of labor intensive sanding, reduction in the number of coatings required to obtain adequate holdout and performance, the ability to size three-dimensional substrates easily, more economical substrate preparation as compared to UV filler, and a formaldehyde free composition. Types of potential substrates include all fibrous boards, such as, but not limited to: medium density fiber board, low density fiber board, masonite, mindy board, door skins, board for shower stalls, flake board, edge coats, luan, and fiber cement board.

Although the invention has been described in some detail by way of illustration for purposes of clarity of understanding, it will be apparent to those of ordinary skill in the art that various modifications and equivalents can be made without departing from the spirit and scope of the invention. It should be understood that the foregoing discussion and examples merely present a detailed description of certain preferred embodiments. All the patents, journal articles and other documents discussed or cited above are herein incorporated by reference in their entirety.

The claimed invention is:

1. A method of using carboxymethyl cellulose acetate butyrate as a sizing composition to improve holdout on a coated, cellulosic substrate, comprising the steps:

applying an aqueous carboxymethyl cellulose acetate butyrate size composition to a cellulosic substrate to form a sized, cellulosic substrate;

drying the sized, cellulosic substrate;

applying an aqueous coating composition to the sized, cellulosic substrate to form a coated, sized cellulosic substrate; and drying the coated, sized cellulosic substrate;

wherein the aqueous carboxymethyl cellulose acetate butyrate size composition comprises carboxymethyl cellulose acetate butyrate;
water; and
an organic solvent.

2. A method of claim 1, wherein the cellulosic substrate is selected from the group consisting of: man-made fiber board, high density fiber board, medium density fiber board, low density fiber board, cardboard, chipboard, particle board, masonite, cement fiber board and mindy board.

3. A method of claim 1, wherein the carboxymethyl cellulose acetate butyrate has a degree of substitution per anhydroglucose unit of carboxymethyl of 0.20 to 0.75, a degree of substitution per anhydroglucose unit of hydroxyl from about 0.10 to 0.70, and a degree of substitution per anhydroglucose unit of butyryl of about 0.10 to 2.60 and a degree of substitution per anhydroglucose unit of acetyl of 0.10 to 1.65.

4. A method of claim 1, wherein the aqueous coating composition further comprises a colorant.

5. A method of claim 1, wherein the organic solvent is selected from the group consisting of acetone, methyl ethyl ketone, methyl isobutyl ketone, methyl amyl ketone, methyl isoamyl ketone, 2-propoxy-ethanol, 2-butoxyethanol, ethyl 3-ethoxypropionate, 2-butanone, methanol, ethanol, propanol, isopropyl alcohol, butanol, 2-ethyl-hexanol, ethyl acetate, propyl acetate, isopropyl acetate, butyl acetate, isobutyl acetate, ethyl ether, propyl ether, propyl glycol butyl ether, diethylene glycol methyl ether, diethylene glycol ethyl ether, diethylene glycol butyl ether, dipropylene glycol ether, dipropylene glycol methyl ether, ethylene glycol, ethylene glycol butyl ether, ethylene glycol diethyl ether, ethylene glycol dimethyl ether, ethylene glycol ethyl ether, ethylene glycol 2-ethylhexyl ether, ethylene glycol methyl ether, ethylene glycol phenyl ether, 1-methyl-2-pyrrolidinone, ethylene glycol diacetate, ethylene glycol monoethyl ether, ethylene glycol monopropyl ether, ethylene glycol monobutyl ether, ethyl ether, propylene glycol butyl ether, propylene glycol dimethyl ether, propylene glycol ethyl ether acetate, propylene glycol methyl ether, propylene glycol ethyl ether, propylene glycol propyl ether, propylene glycol butyl ether, propylene glycol methyl ether acetate, propylene glycol phenyl ether, propylene glycol propyl ether, propylene glycol, tripropylene ethyl ether, triethylene glycol, tri(ethylene glycol) dimethyl ether, and mixtures thereof.

6. A method of claim 1, wherein the size composition further comprises one or more coatings additives selected from the group consisting of waxes, plasticizers, organic or inorganic bases, leveling agents, flow control agents and rheology modifiers; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; coalescing agents; and mixtures thereof.

7. A method of claim 1, wherein the size composition further comprises a plasticizer as an additive.

8. A method of claim 7, wherein the plasticizer is selected from the group consisting of 2,2,4-trimethyl-1,3-pentanediol diisobutyrate, diisononyl phthalate, dioctyl phthalate, butyl benzyl phthalate, dibutyl phthalate, diethylene glycol, dioctyl terephthalate, and mixtures thereof.

* * * * *